Sept. 30, 1952   E. F. W. ALEXANDERSON ET AL   2,612,629
CURRENT INTERRUPTER
Filed April 17, 1951

Inventor:
Ernst F. W. Alexanderson,
Albert H. Mittag,
Robert W. Kuenning,
by Paul A. Frank
Their Attorney.

Patented Sept. 30, 1952

2,612,629

UNITED STATES PATENT OFFICE 2,612,629

CURRENT INTERRUPTER

Ernst F. W. Alexanderson and Albert H. Mittag, Schenectady, N. Y., and Robert W. Kuenning, Berkeley, Calif., assignors to General Electric Company, a corporation of New York Application April 17, 1951, Serial No. 221,406

10 Claims. (Cl. 321—11)

This invention relates to improved apparatus for interrupting electric currents in direct current circuits.

An object of this invention is to provide an improved, fast-acting current interrupter, or circuit breaker, for suddenly interrupting direct current supplied to an inductive load. Other objects and advantages will appear as the description proceeds.

Figure 2:
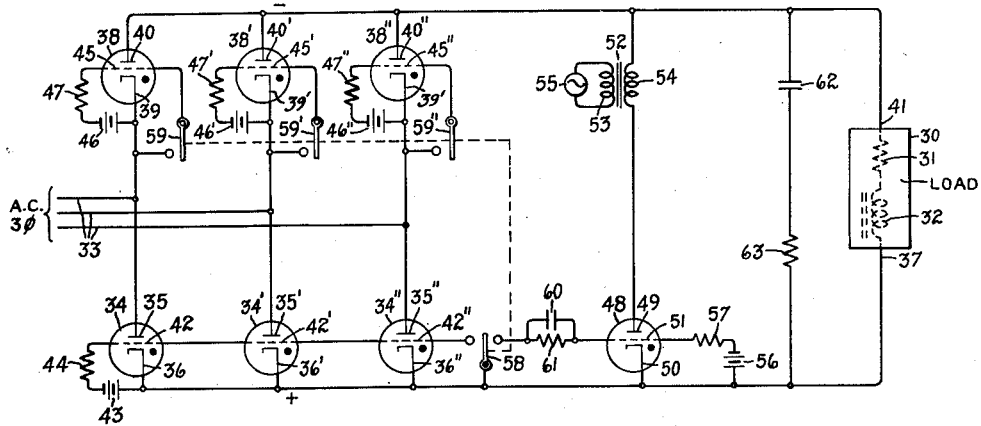
Figure 3:
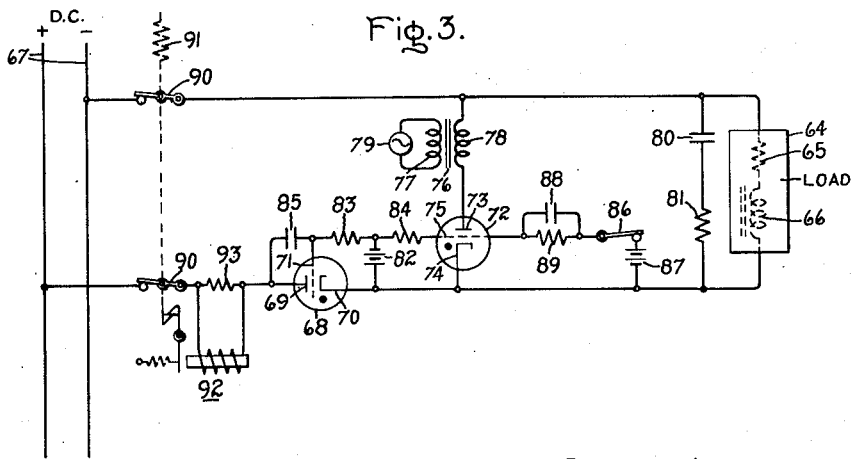

The features of this invention which are believed to be novel and patentable are pointed out in the claims which form a part of this specification. For a better understanding of the invention, reference is made in the following description to the accompanying drawing in which Fig. 1 is a circuit diagram of the invention embodied in a full-wave rectifier circuit for supplying direct current to a load from a single-phase alternating-current line, Fig. 2 is a circuit diagram of the invention embodied in a rectifier circuit for supplying direct current to a load from a three-phase alternating-current line, and Fig. 3 is a circuit diagram of an embodiment of the invention in a branch circuit for supplying current to a load from a direct current line or bus.

Figure 1:
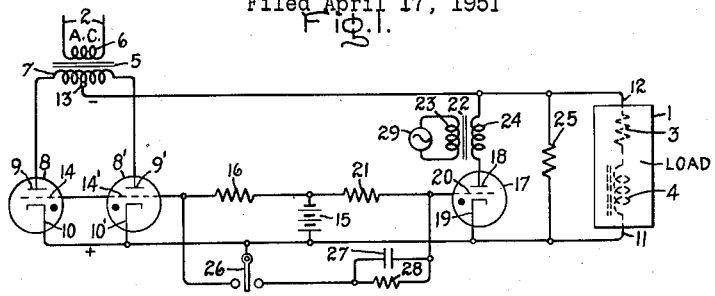

Referring now to Fig. 1, direct current is supplied to a load 1 from a single phase alternating current line 2. Load 1 may be represented by the combination of resistance 3 and inductance 4. A transformer 5 has a primary winding 6 connected to alternating-current line 2. Transformer 5 has a center-tapped secondary winding 7. Two rectifiers 8 and 8', which preferably are electric discharge devices of a gas-filled or vapor-filled type, have anodes 9 and 9' respectively connected to opposite ends of secondary winding 7. The rectifiers have cathodes 10 and 10' connected together and to one terminal 11 of load 1. The other terminal 12 of load 1 is connected to the center tap 13 of secondary winding 7.

Rectifiers 8 and 8' have control electrodes 14 and 14', respectively, to which a negative bias potential is applied by battery 15, or other suitable means, through current limiting resistor 16. This bias potential has a sufficiently negative value that it tends to maintain rectifiers 8 and 8' nonconductive.

A discharge device 17 has an anode 18, a cathode 19 and a control electrode 20. Preferably device 17 is an electric discharge device of the gas-filled or vapor-filled type, but a high vacuum electron discharge device may be used in some applications. A negative bias potential, which tends to maintain device 17 normally nonconductive, is applied to control electrode 20 by battery 15 through current limiting resistor 21. A transformer 22 has a primary winding 23 and a secondary winding 24. Device 17 and secondary winding 24 are connected in series with each other, and in shunt across load 1, as shown in the drawing. A resistor 25 is also connected in shunt across load 1.

A double-throw switch 26 is connected so that when switch 26 is closed to the left, control electrodes 14 and 14' are connected to cathodes 10 and 10', thereby removing the negative bias potential from these electrodes and permitting rectifiers 8 and 8' to become conductive. When closed to the right, switch 26 connects control electrode 20 to cathode 19 through a capacitor 27 and a resistor 28 in parallel. When switch 26 is closed to the right, capacitor 27 begins to charge through resistor 21, thereby applying a relatively positive electric impulse to control electrode 20, which initiates conduction of current through device 17 by making its control electrode less negative. Preferably, resistor 28 is large in value compared to resistor 21, so that a substantial negative bias potential is again applied to electrode 20 after termination of the brief impulse produced by the charging current of capacitor 27, so that device 17 tends to become nonconductive again immediately after each impulse, regardless of the position in which switch 26 may be left.

Any suitable source of alternating current 29 is connected to supply alternating current through primary winding 23. This produces a large alternating voltage in secondary winding 24, in series with device 17.

The circuit operates as follows: When it is desired to supply current to load 1, switch 26 is closed to the left. This removes the negative bias potential from control electrodes 14 and 14', thus permitting rectifiers 8 and 8' to become conductive and supply current to the load. When it is desired to interrupt current to the load, switch 26 is closed to the right. This reapplies negative bias potential to control electrodes 14 and 14', so that rectifiers 8 and 8' tend to become nonconductive. However, ionization of the gas or vapor in the rectifier discharge devices prevents electrodes 14 and 14' from becoming immediately effective to stop the current through the rectifiers. The inductance of load 4 also tends to maintain current flow in the circuit.

The desired sudden interruption of current through the load is effected by the operation of device 17. When switch 26 is closed to the right, charging current drawn by capacitor 27 applies a relatively positive impulse to control electrode 20, thereby initiating current flow through device 17. Conduction of current through device 17 occurs when the polarity of the alternating voltage induced in secondary winding 24 is such that anode 18 is positive with respect to cathode 19.

The current through device 17 flows through the circuit including rectifiers 8 and 8', and passes through the rectifiers in the reverse direction to the current supplied by the rectifiers to load 1. Therefore, in effect the current through device 17 opposes the load current through the rectifiers, and in fact reduces the net current through the rectifiers to zero for a sufficient length of time to permit the rectifiers to de-ionize, and thereby to become nonconductive.

On the next half-cycle of the alternating voltage induced in secondary winding 24, anode 18 becomes negative with respect to cathode 19. This tends to reverse the current through device 17, whereupon device 17 de-ionizes and becomes nonconductive. Thus, the flow of current to the load is quickly interrupted, without mechanical contacts.

Since considerable energy may be stored in the inductance of the load when the current is suddenly interrupted, a resistor 25 is connected in shunt across the load to dissipate this energy. Other energy-dissipating impedance devices, such as spark gaps, may be used in place of the resistor. Therefore, upon the interruption of current to the load, current flows through the load and resistor 25 until the energy stored in the load inductance has been dissipated. Since the rate of decay of this current is determined by the inductance and resistance values of the load, and the value of shunt resistor 25, the decay rate desired can be obtained by selecting a suitable value of shunt resistance. The value of alternating voltage is selected so that the voltage induced in winding 24 is larger than the voltage drop across the shunt resistor due to current induced by the load inductance.

It will be appreciated that the alternating current supplied to primary winding 23 need not be of the same frequency as the alternating current in line 2. Since the current in the circuit is interrupted within one cycle of the alternating current supplied to primary winding 23, by making this current of a relatively high frequency the current to the load may be interrupted within a fraction of a cycle of the current in alternating-current line 2. The upper limit to the frequency of current which may be applied to winding 23 is determined by the de-ionization time of the discharge devices employed in the circuit.

Fig. 2 shows a circuit for supplying direct current to a load 30, comprising resistance 31 and inductance 32, from a three-phase alternating-current line 33. Rectifiers 34, 34' and 34'', which preferably are discharge devices of the gas-filled or vapor-filled type, have anodes 35, 35' and 35'' respectively connected to the three phases of line 33. Cathodes 36, 36' and 36'' are connected together and to one terminal 37 of load 30. Similar rectifiers 38, 38' and 38'' have cathodes 39, 39' and 39'' respectively connected to the three phases of line 33, and have anodes 40, 40' and 40'' connected to the other terminal 41 of load 30. Rectifiers 35, 35' and 35'' have control electrodes 42, 42' and 42'', respectively, to which a negative bias potential is applied by battery 43, or other suitable voltage source, through current-limiting resistor 44. Rectifiers 38, 38' and 38'' have control electrodes 45, 45' and 45'' to which negative bias potential is applied by batteries 46, 46' and 46'' through current-limiting resistors 47, 47' and 47'' respectively.

An additional discharge device 48 has an anode 49, a cathode 50 and a control electrode 51. A transformer 52 has a primary winding 53 and a secondary winding 54. Device 48 and secondary winding 54 are connected in series with each other, and in shunt across load 30, as shown in the drawing. Alternating current is supplied to primary winding 53 by any suitable source 55. Negative bias potential is applied to control electrode 51 by battery 56 through current-limiting resistor 57, or other suitable means. A double-throw switch 58 is connected so that, when closed to the left, it connects control electrodes 42, 42' and 42'' to cathodes 36, 36' and 36'', thereby removing the negative bias potential from these control electrodes and permitting rectifiers 34, 34' and 34'' to become conductive. Switches 59, 59' and 59'' are ganged to switch 58, or are operated simultaneously therewith by relays or other means, so that when switch 58 is closed to the left, switches 59, 59' and 59'' are also closed to the left, and connect control electrodes 45, 45' and 45'' to cathodes 39, 39' and 39'' respectively. This permits rectifiers 38, 38' and 38'' to become conductive.

When closed to the right, switch 58 connects control electrode 51 to cathode 50 through capacitor 60 and resistor 61 in parallel. The charging current drawn by capacitor 60 through resistor 57 applies a relatively positive impulse to control electrode 51, thereby initiating current flow through device 48.

To dissipate energy stored in the inductance of load 30 when the current is suddenly interrupted, a capacitor 62 and a resistor 63 are connected in series with each other and in shunt across load 30, as shown. Capacitor 62 prevents the flow of direct current through resistor 63, and thereby prevents loss of power in the shunt resistor during times when current is being supplied to the load. However, when current to the load is suddenly interrupted, oscillatory currents are established between capacitor 62 and load inductance 32, and these oscillatory currents flow through resistor 63 until the energy stored in inductance 32 is dissipated. It will be understood, of course, that capacitor 62 may be omitted, and resistor 63 alone connected in shunt with the load, where the power loss in the dissipating resistor is not considered objectionable. It will also be appreciated that a similar capacitor may be inserted in series with resistor 25, Fig. 1, to prevent the flow of direct current through that resistor.

Operation of the Fig. 2 circuit is similar to operation of the Fig. 1 circuit. When switches 58, 59, 59', 59'' are closed to the left, the rectifiers become conductive and direct current is supplied to load 30. When switch 58 is closed to the right, the control electrodes of the rectifiers become negative, so that the rectifiers tend to become non-conductive. However, current continues to flow through the rectifiers due to the ionization of the gas or vapor which fills these devices, and the inductance of the load. At the same time, a positive impulse is applied to control electrode 51, which initiates current flow through device 48 when the polarity of the alternating voltage induced in secondary winding 54 is such that anode 49 is positive with respect to cathode 50. This produces a reverse current through the rectifiers, which opposes the current supplied by the rectifiers to the load and momentarily reduces the net rectifier current to zero for a sufficient period to permit de-ionization of the rectifier devices.

During the next half-cycle of alternating voltage induced in secondary winding 54, anode 49 becomes negative with respect to cathode 50, and device 48 de-ionizes. Current to the load is then completely interrupted, except for the oscillatory currents through capacitor 62 and resistor 63, which persist just long enough to dissipate the energy stored in load inductance 32.

A quick-acting circuit breaker for a direct-current branch circuit is shown in Fig. 3. Referring now to this figure, a load 64, comprising resistance 65 and inductance 66, is supplied with direct current from a direct current line or bus 67. In series with load 64 is a discharge device 68, preferably of a gas-filled or vapor-filled type, having an anode 69, a cathode 70 and a control electrode 71.

A second discharge device 72 has an anode 73, a cathode 74 and a control electrode 75. A transformer 76 has a primary winding 77 and a secondary winding 78. Device 72 and secondary winding 78 are connected in series with each other, and in shunt across load 64. Alternating current is supplied to primary winding 77 from any convenient source 79. A capacitor 80 and a dissipating resistor 81 are connected in series with each other and in shunt across load 64, as shown, to dissipate the energy stored in load inductance 66 when the circuit is suddenly interrupted.

A negative bias potential which tends to maintain devices 68 and 72 normally non-conductive is supplied to control electrodes 71 and 75 by any suitable means, such as battery 82, through current-limiting resistors 83 and 84 respectively. A capacitor 85 is connected between anode 69 and control electrode 71, for reasons hereinafter explained. A switch 86 is connected to supply a positive potential from any suitable source, such as battery 87, to control electrode 75 through capacitor 88 and resistor 89 in parallel.

A disconnect switch 90, preferably of the double-pole type as shown, is connected in series with device 68 and load 64. Switch 90 is biased to a normally open position by spring 91. An interlock, or solenoid latch 92, energized by a voltage drop across a resistor 93, is arranged to prevent the opening of switch 90 when current flows therethrough.

The operation of this high-speed direct-current circuit breaker is as follows:

When it is desired to supply current to load 64, disconnect switch 90 is closed. This applies a voltage across device 68, and causes capacitor 85 to charge through resistor 83. The capacitor charging current provides a positive impulse at control electrode 71, which initiates current flow through device 68. As soon as capacitor 85 has charged, control electrode 71 again becomes negative, but the control electrode is ineffective to interrupt current flow through device 68 because of the ionization of the gas or vapor within the tube. Current flow through the circuit produces a voltage drop across resistor 93, which energizes solenoid latch 92, and causes the latch to operate to prevent the opening of disconnect switch 90.

When it is desired to interrupt the direct current through the load, switch 86 is closed. Capacitor 88 then charges through resistor 84, and thus applies a positive impulse to control electrode 75, which initiates conduction of current through device 72 as soon as the polarity of the alternating voltage induced in secondary winding 78 is such that anode 73 is positive with respect to cathode 74. Resistor 89 is large in value compared to resistor 84, so that as soon as capacitor 88 has become charged, control electrode 75 again becomes negative.

The current flow through device 72 passes through device 68 in the reverse direction to the current transmitted to load 64, so that the net current through device 68 is reduced to zero for a sufficient period of time for the gas or vapor within the discharge device to de-ionize. This interruption of current likewise de-energizes solenoid latch 92, and spring 91 then causes disconnect switch 90 to open. Since switch 90 opens at a time when no current is flowing therethrough, there is no harmful arcing at the contacts.

During the next half-cycle of the alternating voltage induced in secondary winding 78, anode 73 becomes negative with respect to cathode 74, and device 72 de-ionizes and becomes non-conductive. Current to load 64 is then completely interrupted, except for the oscillating currents which may flow between the load, capacitor 80 and resistor 81 until the energy stored in load inductance 66 has been dissipated in the resistor.

Having described the principle of this invention of the best mode in which we have contemplated applying that principle, we wish it to be understood that the examples described are illustrative only, and that other means may be employed to carry out the invention.

What we claim as new and desire to secure by Letters Patent of the United States is:

1. In an electricity transmission circuit, a current interrupter comprising a series-connected electric discharge device and a shunt-connected discharge device each having a control electrode, means for varying the respective potentials of said control electrodes to cause each of said devices to tend to become conductive or nonconductive selectively, means to apply an alternating voltage in series with said shunt-connected device, and a shunt-connected energy-dissipating impedance.

2. In an electric circuit for transmitting direct current to an inductive load, a current interrupter comprising first and second discharge devices each having a control electrode, said first device being connected in series with the load, a transformer having a primary winding and a secondary winding, said second device and said secondary winding being connected in series with each other and in shunt across the load, means to supply alternating current to said primary winding, a resistor connected across the load, means to vary the control electrode potential of said first device to cause such device to tend to become conductive or non-conductive selectively, means to maintain the control electrode potential of said second device normally at a value which tends to keep such device non-conductive, and means to apply an electric impulse to the control electrode of said second device to initiate conduction of current therethrough.

3. In an electric circuit for transmitting direct current to an inductive load, a current interrupter comprising first and second discharge devices each having a control electrode, said first device being connected in series with said load, said second device being connected in shunt across said load, means to apply an alternating voltage in series with said second device, a resistor and a capacitor connected in series with each other and in shunt across the load, and means for varying the respective potentials of said control electrodes to cause each of said devices to tend to become conductive or non-conductive selectively.

4. In an electric circuit for supplying direct current to an inductive load from an alternating-current line, the combination comprising at least one rectifier connected in series with the load, said rectifier being a discharge device having a control electrode, means for varying the rectifier control electrode potential to cause said rectifier to tend to become conductive or nonconductive selectively, a second discharge device having a control electrode, said second device being connected in shunt across the load, means to apply an alternating voltage in series with said second device, and means to vary the control electrode potential of said second device to cause such device to tend to become conductive or nonconductive selectively.

5. In an electric circuit for supplying direct current to an inductive load from an alternating-current line, the combination comprising at least one rectifier connected in series with the load, said rectifier being an electric discharge device having a control electrode, means to provide a control electrode potential for said rectifier of a value which causes the rectifier to become conductive, a second electric discharge device having a control electrode, a transformer having a primary winding and a secondary winding, said second device and said secondary winding being connected in series with each other and in shunt across the load, means to supply alternating current to said primary winding, means to provide a normal control electrode potential for said second device of a value which tends to maintain such device normally nonconductive, means to provide selectively a second value of control electrode potential for said rectifier which tends to cause the rectifier to be nonconductive and simultaneously to provide an electric impulse to the control electrode of said second device which initiates the conduction of current therethrough, and an energy-dissipating impedance connected in shunt across the load.

6. An electric circuit for supplying direct current to a two-terminal load from an alternating current line, comprising a first transformer having a primary winding and a center-tapped secondary winding, said primary winding being connected to the alternating current line, a pair of first discharge devices each having an anode, a cathode and a control electrode, the respective anodes of said first devices being connected to opposite ends of said secondary winding, the cathodes of said first devices being connected together and to one terminal of the load, the other terminal of the load being connected to the center tap of said secondary winding, a second discharge device having an anode, a cathode and a control electrode, a second transformer having a primary winding and a secondary winding, said second device and a secondary winding of said second transformer being connected in series with each other and in shunt across the load, means to vary the control electrode potential of said first devices to cause such device to tend to become conductive or nonconductive selectively, means to provide a negative bias potential to the control electrode of said second device to maintain such device normally nonconductive, means to apply a positive electric impulse to the control electrode of said second device to initiate conduction of current therethrough, and a resistor connected in shunt across the load.

7. An electric circuit for supplying direct current to a two-terminal load from a three-phase alternating-current line comprising three rectifiers respectively connected between each phase of the three-phase line and one terminal of the load, three rectifiers respectively connected between each phase of the three-phase line and the other terminal of the load, each of said rectifiers being a discharge device having a control electrode, means for varying the control electrode potentials of said rectifiers to cause the rectifiers to tend to become conductive or nonconductive selectively, a discharge device connected in shunt across the load, said shunt-connected device having a control electrode, means to apply an alternating voltage in series with said shunt-connected device, and means for varying the control electrode potential of said shunt-connected device to cause such device to tend to become conductive or nonconductive selectively.

8. An electric circuit for supplying direct current to a two-terminal load from a three-phase alternating-current line, comprising a plurality of rectifiers connected in series with the load, said rectifiers including three electric dscharge devices having anodes connected to respective phases of the three-phase line, having cathodes connected together and to one terminal of the load, and having control electrodes, and including three electric discharge devices having cathodes connected to respective phases of the three-phase line, having anodes connected together and to the other terminal of the load, and having control electrodes, a transformer having a primary winding and a secondary winding, an additional discharge device having an anode, a cathode and a control electrode, said secondary winding and said additional device being connected in series with each other and in shunt across the load, means to supply alternating current to said primary winding, a resistor connected in shunt across the load, means to vary the control electrode potentials of said rectifiers to cause the rectifiers to tend to become conductive or nonconductive selectively, means to provide a negative bias potential to the control electrode of said additional device to maintain such device normally nonconductive, and means to apply a positve electric impulse to the control electrode of said additional device to initiate conduction of current therethrough.

9. In a direct-current electric circuit, a circuit interrupter comprising a series-connected discharge device and a shunt-connected discharge device each having a control electrode, means for varying the respective potentials of said control electrodes to cause each of said devices to tend to become conductive or nonconductive selectively, means to apply an alternating voltage in series with said shunt-connected device, a disconnect switch in series with said series-connected device, and means to prevent opening of said disconnect switch while current is passing therethrough.

10. In an electric circuit for transmitting direct current to an inductive load from a direct-current line, a circuit interrupter comprising first and second electric discharge devices each having an anode, a cathode and a control electrode, a transformer having a primary winding and a secondary winding, said first device being connected in series with the load, said second device and said secondary winding being connected in series with each other and in shunt across the load, a capacitor and a resistor connected in series with each other and in shunt across the load, means to apply negative bias potential to each of said control electrodes of a value which tends to maintain said first and second devices nonconductive, a disconnect switch connected in series with said first device, means biasing said disconnect switch to the open position, means preventing the opening of said disconnect switch while current is passing therethrough, means to apply a positive electric impulse to the control electrode of said first device upon closing of said disconnect switch, whereby conduction of current therethrough is initiated, and means to apply a positive electric impulse to the control electrode of said second device to initiate conduction of current therethrough.

ERNST F. W. ALEXANDERSON.
ALBERT H. MITTAG.
ROBERT W. KUENNING.

REFERENCES CITED

The following references are of record in the file of this patent:

UNITED STATES PATENTS

| Number | Name | Date |
|---|---|---|
| 1,691,395 | Langmuir | Nov. 13, 1928 |
| 1,945,627 | Brunner | Feb. 6, 1934 |
| 2,276,796 | Rogers | Mar. 17, 1942 |
| 2,276,851 | Livingston | Mar. 17, 1942 |

FOREIGN PATENTS

| Number | Country | Date |
|---|---|---|
| 262,055 | Germany | July 4, 1913 |
| 405,932 | England | Feb. 15, 1934 |